United States Patent [19]

Murai et al.

[11] Patent Number: 4,578,441
[45] Date of Patent: Mar. 25, 1986

[54] EMULSION POLYMERIZATION PROCESS FOR PRODUCTION OF α-METHYLSTYRENE COPOLYMER

[75] Inventors: Osamu Murai, Osaka; Noboru Moriyama, Wakayama, both of Japan

[73] Assignee: Kao Corporation, Tokyo, Japan

[21] Appl. No.: 765,906

[22] Filed: Aug. 14, 1985

[30] Foreign Application Priority Data

Aug. 22, 1984 [JP] Japan ................. 59-174441

[51] Int. Cl.⁴ .............................. C08F 2/24

[52] U.S. Cl. .................. 526/216; 526/347.1
[58] Field of Search ............... 526/216, 347.1

Primary Examiner—Paul R. Michl
Attorney, Agent, or Firm—Flynn, Thiel, Boutell & Tanis

[57] ABSTRACT

An α-methylstyrene copolymer is produced by effecting the emulsion polymerization of α-methylstyrene and another co-monomer in the presence of a succinic acid derivative having a C8 to C40 alkenyl group or a salt thereof.

5 Claims, No Drawings

EMULSION POLYMERIZATION PROCESS FOR PRODUCTION OF α-METHYLSTYRENE COPOLYMER

The present invention relates to an emulsion polymerization process for the production of an α-methylstyrene copolymer excellent in the heat resistance.

PRIOR ARTS AND PROBLEMS THEREOF

Various thermoplastic resins represented by ABS are now used widely in various fields. However, in the field of automobile parts or light electrical appliances where a high heat resistance is required, the heat resistance of these thermoplastic resins is yet insufficient and it is desired to improve the heat resistance. As means for improving the heat resistance of ABS, there have been adopted a process in which an α-methylstyrene copolymer is incorporated in ABS, and a process in which an α-methylstyrene monomer is grafted to the main chain when an ABS resin is prepared. However, since the polymerizability of this α-methylstyrene monomer is low, when it is intended to obtain a copolymer having a high α-methylstyrene content, a large amount of unreacted α-methylstyrene is left in a later stage of the polymerization reaction and the heat resistance is degraded contrary to expectation. A process in which α-methylstyrene is copolymerized with acrylonitrile is ordinarily adopted for increasing the polymerizability of α-methylstyrene but addition of acrylonitrile results in reduction of the heat resistance. Therefore, needless to say, it is preferred that the amount of acrylonitrile added be as small as possible. Accordingly, improvements have been made to polymerization recipes, and the kind of the monomer to be added and the time of addition are examined in detail, as is seen from the proposal where the content of the α-methylstyrene monomer is increased at the initial stage of the polymerization. However, such complicated polymerization recipes are industrially disadvantageous, and hence, development of simple polymerization recipes is eagerly desired.

MEANS FOR SOLVING PROBLEMS

An α-methylstyrene copolymer is ordinarily prepared by emulsion polymerization. We considered that the role of a surface active agent is very important for emulsion polymerization and there should be present a certain surface active agent suitable for the production of this α-methylstyrene copolymer. We made research based on this consideration, and as the result, we found that an addition reaction product between an α,β-unsaturated dicarboxylic acid or an anhydride thereof and a compound having an unsaturated hydrocarbon group is effective as the surface active agent for the production of an α-methylstyrene copolymer. We have now completed the present invention based on this finding.

More specifically, in accordance with the present invention, there is provided an emulsion polymerization process for the production of an α-methylstyrene copolymer, characterized in that the emulsion polymerization is carried out by using a surface active agent comprising as an indispensable component a substituted succinic acid having at least one alkenyl or alkyl group or a salt thereof, said substituted succinic acid being obtained by reacting an α,β-unsaturated dicarboxylic acid having 4 to 12 carbon atoms or an anhydride of said carboxylic acid with an alkene having 8 to 40 carbon atoms and, if desired, subjecting the reaction product to hydrogenation.

In other words, the invention relates to a process for producing an α-methylstyrene copolymer, which comprises the step of effecting the emulsion polymerization of α-methylstyrene and another co-monomer in the presence of a succinic acid derivative having at least one alkenyl group or a salt thereof, which has been obtained by reacting an α,β-unsaturated dicarboxylic acid having 4 to 12, preferably 4, carbon atoms or an anhydride thereof with an alkene having 8 to 40, preferably 10 to 20, carbon atoms.

The succinic acid derivative may be further hydrogenated to convert the alkenyl group to a corresponding alkyl group. The most preferably succinic acid derivative is a C12 to C20 alkenyl or alkyl succinic acid.

The succinic acid derivative to use in the invention may be defined as an alkenyl succinic acid derivative in which the alkenyl group has 8 to 40 carbon atoms and the succinic acid portion has 4 to 12 carbon atoms.

In the present invention, an addition reaction product between an α,β-unsaturated dicarboxylic acid or an anhydride thereof and a compound having an unsaturated hydrocarbon group, as disclosed in, for example, Japanese Patent Application Laid-Open Specification No. 12382/81 or No. 167247/80, can be used as the surface active agent for emulsion polymerization for the production of an α-methylstyrene copolymer. More specifically, a substituted succinic acid having an alkenyl group or a salt thereof, which is obtained by subjecting an alkene and an unsaturated dicarboxylic acid or an anhydride thereof in a solvent or in the absence of a solvent to so-called ene-addition reaction under atmospheric or elevated pressure at a temperature in the range of from room temperature to 300° C. and, if desired, subjecting the reaction product to neutralization with an alkali or amine (ammonia) directly or after purification or after hydrolysis, and a substituted succinic acid having an alkyl group or a salt thereof, which is obtained by subjecting the above-mentioned succinic acid having an alkenyl group or its salt to hydrogen reduction with a Raney nickel catalyst, may be used as the surface active agent for emulsion polymerization for the production of an α-methylstyrene copolymer in the present invention.

Alkenes having 8 to 40 carbon atoms, preferably 8 to 22 carbon atoms, are used as the alkene in the present invention. For example, there may be preferably used α-olefins obtained by cracking of petroleum paraffin or polymerization of ethylene, propylene or butylene, branched olefins, vinyldene type olefins, olefins obtained by dehydrogenation of a butadiene oligomer or petroleum paraffin, and internal olefins obtained by disproportionation of the foregoing olefins.

As the α,β-unsaturated dicarboxylic acid or its anhydride, those having 4 to 12 carbon atoms are used in the present invention. As preferred examples, there can be mentioned maleic anhydride, maleic acid, fumaric acid, citraconic acid, citraconic anhydride, itaconic acid and itaconic anhydride.

The reason why the above-mentioned surface active agent is suitable for emulsion polymerization for the production of an α-methylstyrene copolymer is that the adsorbability of the active agent on the surfaces of polymer particles is very high. More specifically, fine polymer particles formed in water by emulsion polymerization have a large surface area and are unstable from the viewpoint of energy, and stabilization of such fine polymer particles in water is one of important roles of the active agent in emulsion polymerization and for attaining this stabilizing effect, it is necessary that the active agent should be strongly adsorbed on the polymer particles.

Moreover, since the surface active agent of the present invention has a carboxyl group as the functional group, separation of the resin component from the formed emulsion can be easily accomplished by addition of an acid or a salt of $Ca^{++}$, $Mg^{++}$ or $Al^{+++}$. Furthermore, since the active agent of the present invention has a high biodegradability though it has a structure resembling that of a fatty acid soap, the active agent can be easily post-treated even if it is contained in waste water.

Emulsion polymerization for the production of an α-methylstyrene copolymer by using the surface active agent of the present invention can be carried out according to customary procedures except that the pH value of the polymerization liquid is adjusted to a level higher than 6 because the functional group of the active agent is a carboxyl group. More specifically, polymerization of a monomer mixture containing an α-methylstyrene monomer is carried out in water by using a radical initiator in the presence of the surface active agent of the present invention in an amount of 0.1 to 10 parts by weight, preferably 0.5 to 3 parts by weight, of the total monomers. The content of α-methylstyrene in the monomer mixture is 1 to 90 wt.%, preferably 1 to 50 wt.%, more preferably 5 to 30 wt.%. As the monomer to be copolymerized with α-methylstyrene, there can be mentioned acrylonitrile, methyl methacrylate and monovinyl aromatic compounds such as styrene and styrene derivatives other than α-methylstyrene. The above-mentioned emulsion polymerization may be carried out in the presence of a diene type polymer such as a butadiene polymer or a styrene-butadiene copolymer. As the polymerization initiator, there can be mentioned a water-soluble persulfate or a redox type initiator comprising typically an organic peroxide such as cumene hydroperoxide and $Fe^{++}$. Moreover, a buffering agent, a chain transfer agent and the like may be appropriately added. Furthermore, the surface active agent of the present invention may be used in combination with an anionic surface active agent such as a fatty acid salt, an alkylarylsulfonate or an alkyl sulfate or a nonionic surface active agent containing a polyoxyethylene chain.

EXAMPLES

The present invention will now be described in detail with reference to the following examples that by no means limit the scope of the invention. Incidentally, all of "parts" are by weight in the examples.

Example 1 and Comparative Examples 1 and 2

A reaction vessel purged with $N_2$ was charged with 50 parts of water and the temperature was elevated to 75° C. by heating, and then, an emulsion of 100 parts of monomers shown in Table 1, 1.5 parts of a surface active agent shown in Table 1 and 0.5 part of ammonium persulfate in 100 parts of water was added dropwise over a period of 2 hours under agitation at 200 rpm. After the dropwise addition, the reaction mixture was aged at 75° C. for 1 hour. The obtained latex was evaluated according to methods described below. The obtained results are shown in Table 1.

Polymerization Stability:

The latex was filtered by a 100-mesh metal gauge. The polymerization stability was evaluated by the ratio (% by weight) of the non-passing fraction to the monomer feed.

Polymerization Ratio:

The polymerization ratio was expressed by the ratio (%) of the solids of the latex (dried at 120° C. overnight) to the theoretical value.

Particle Size:

The particle size was determined by simplified turbidimetry.

Viscosity:

The viscosity was measured at room temperature by a Brookfield viscometer.

TABLE 1

| | Surface Active Agent | Monomer Weight Ratio (styrene/α-methylstyrene) | Polymerization Ratio (%) | Polymerization Stability (%) | Particle Size (μ) | Viscosity (cp) |
|---|---|---|---|---|---|---|
| Example 1 | dipotassium hexadecenyl-succinate | 75/25 | 95.3 | 0.11 | 0.08 | 24 |
| Comparative Example 1 | sodium dodecyl-benzenesulfonate | 75/25 | 89.3 | 0.24 | 0.20 | 10 |
| Comparative Example 2 | sodium lauryl sulfate | 75/25 | 58.6 | — | — | — |

Note
—: no measurement was performed because the polymerization ratio was low

Example 2 and Comparative Examples 3, 4 and 5

A reactor was filled with nitrogen gas and then charged with 2.0 parts of a surfactant listed in Table 2, 0.2 part of potassium persulfate and 200 parts of ion-exchanged water. The reaction mixture was heated up to 70° C. Then 100 parts of a monomer mixture listed in Table 2 was added thereto dropwise over a period of 3 hours while agitated at 200 rpm. The obtained latex was examined in the same manner as in example 1. Results are shown in Table 2.

TABLE 2

| | Surface Active Agent | Monomer Mixture | Polymerization Ratio (%) | Polymerization Stability (%) | Particle Size (μ) | Viscosity (cp) |
|---|---|---|---|---|---|---|
| Example 2 | dipotassium octadecenyl- | 70/30/0.3 | 97.0 | 0.11 | 0.06 | 18 |

TABLE 2-continued

|  | Surface Active Agent | Monomer Mixture | Polymerization Ratio (%) | Polymerization Stability (%) | Particle Size (μ) | Viscosity (cp) |
| --- | --- | --- | --- | --- | --- | --- |
| Comparative Example 3 | succinate potassium stearate | 70/30/0.3 | 93.8 | 0.15 | 0.06 | 92 |
| Comparative Example 4 | sodium dodecyl-benzenesulfonate | 70/30/0.3 | 93.5 | 0.14 | 0.06 | 25 |
| Comparative Example 5 | sodium lauryl sulfate | 70/30/0.3 | 92.4 | 0.08 | 0.06 | 18 |

Note
The monomer mixture consisted of α-methylstyrene, Acrylonitrile and tertiary-dodecylmercaptane at a listed weight ratio.

The embodiments of the invention in which an exclusive property or privilege is claimed are defined as follows:

1. A process for producing an α-methylstyrene co-polymer, which comprises the step of effecting the emulsion polymerization of α-methylstyrene and another co-monomer in the presence of a succinic acid derivative having at least one alkenyl group or a salt thereof, which has been obtained by reacting an α,β-unsaturated dicarboxylic acid having 4 to 12 carbon atoms or an anhydride thereof with an alkene having 8 to 40 carbon atoms.

2. A process as claimed in claim 1, in which said succinic acid derivative or salt thereof has been further hydrogenated to convert the alkenyl group to a corresponding alkyl group.

3. A process as claimed in claim 1, in which the alkene has 8 to 22 carbon atoms.

4. A process as claimed in claim 1, in which said α,β-dicarboxylic acid is selected from the group consisting of maleic acid, fumaric acid, itaconic acid and citraconic acid.

5. A process as claimed in claim 1, in which said succinic acid derivative is C12 to C20 alkenyl succinic acid.

* * * * *